United States Patent [19]
Davis, Jr.

[11] 3,990,398
[45] Nov. 9, 1976

[54] ANIMAL CAGE
[75] Inventor: Samuel R. Davis, Jr., Federalsburg, Md.
[73] Assignee: IPCO Hospital Supply Corporation, White Plains, N.Y.
[22] Filed: May 24, 1974
[21] Appl. No.: 472,962

[52] U.S. Cl. .............................................. 119/17
[51] Int. Cl.² ..................................... A01K 1/00
[58] Field of Search ............ 220/DIG. 12, 31 S, 14, 220/82 R, 76, 23.4, 23, 44 A, 44 C, DIG. 18, 72, 83, 84; 119/1, 15–26, 52

[56] References Cited
UNITED STATES PATENTS

| | | | |
|---|---|---|---|
| 1,680,185 | 8/1928 | Viewegh | 119/17 |
| 2,881,733 | 4/1959 | Young, Jr. et al. | 119/15;18 |
| 3,451,453 | 6/1969 | Heck | 220/1 T |
| 3,654,076 | 4/1972 | Hatch | 206/520 |
| 3,726,255 | 4/1973 | Marr | 119/17 |
| 3,752,123 | 8/1973 | Classe et al. | 119/17 |
| 3,791,346 | 2/1974 | Willinger et al. | 119/15 |

Primary Examiner—Louis G. Mancene
Assistant Examiner—Peter K. Skiff

[57] ABSTRACT

An animal cage which has a removable wire mesh bottom strong enough for laboratory animals to walk on.

15 Claims, 6 Drawing Figures

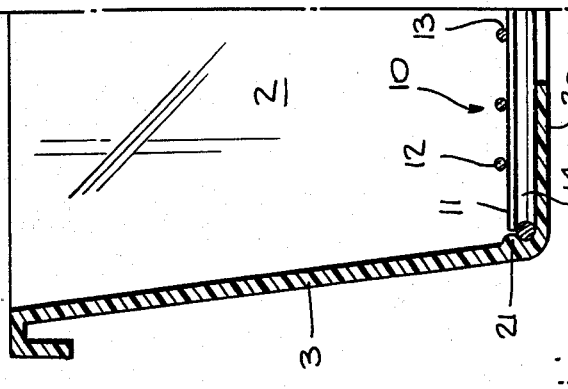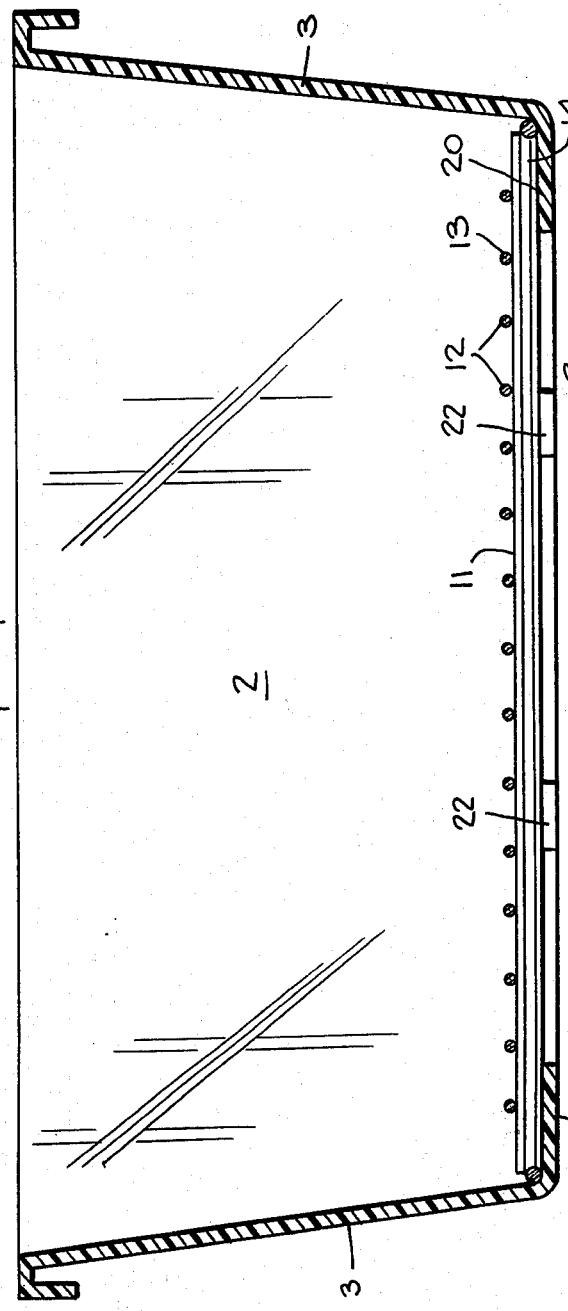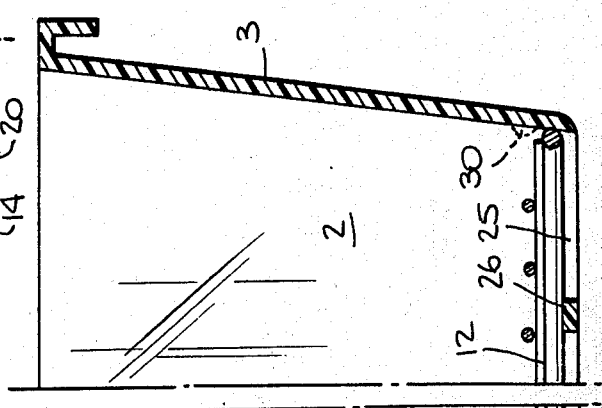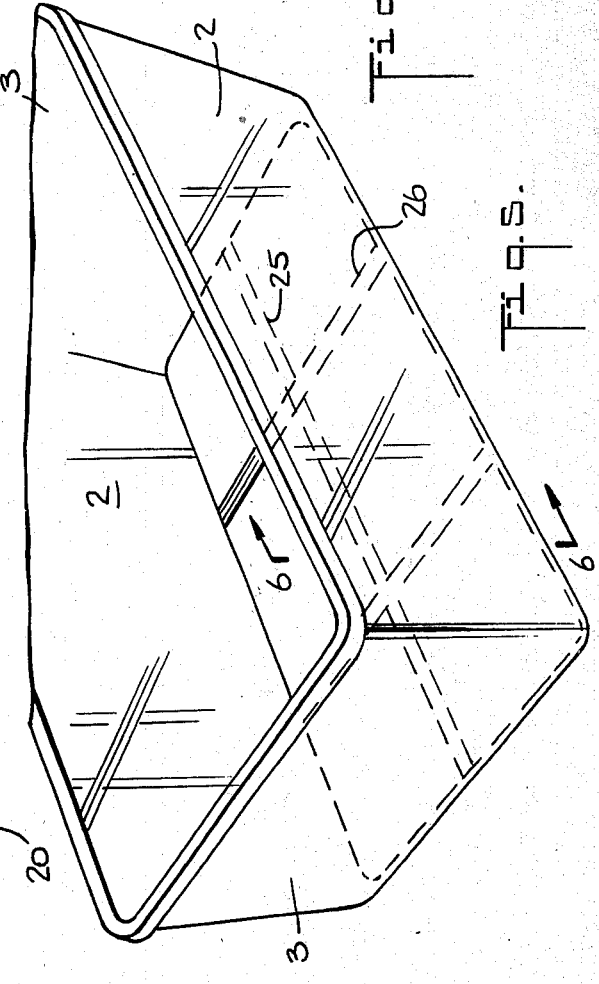

ANIMAL CAGE

DESCRIPTION

The present invention is directed to an improved animal cage and more particularly to an improved animal cage which has a removable bottom wall.

Animal cages usually comprise an upper cage and a lower main body made of a solid transparent material, such as plastic, with integral bottom and side walls made of one piece.

It has been found that such cages frequently become dirty and have to be periodically cleaned. Since the bottoms of the cages are quite deep, cleaning of these cages is a long and involved operation which is time consuming. In addition, the corners of the cages formed by the bottom and the side walls are particularly difficult to clean because of the small spaces involved. Furthermore, such cages are necessarily not in operation while they are being cleaned so that many cages have to be purchased by users.

One solution to this problem has been to form a cage with openings in the bottom such as the cage shown in U.S. Pat. No. 3,397,676. However, in that particular cage, the bottom is quite thick and each opening has vertically extending side walls of the openings combined with the thick bottom would make it even more difficult to clean because there are additional surfaces on which dirt can accumulate.

Furthermore, it is believed that the bottom shown in said patent is permanently mounted in the cage so that the entire cage must be removed from operation until the bottom has been cleaned.

This invention is an improvement over U.S. Pat. No. 3,752,123 dated Aug. 14, 1973 which is directed to a walk-on cage with a snap-on wire mesh lower bottom.

The present invention has for one of its objects, the provision of an improved animal cage which has an improved wire mesh bottom.

Another object of the present invention is the provision of an improved animal cage lid having a wire mesh bottom in which the bottom may be removed from the cage lid without the use of special tools.

Another object of the present invention is the provision of an improved animal cage in which the bottom is made of a material that cannot be chewed by the animal.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 3 is a sectional view taken along line 3—3 of FIG. 1;

FIG. 4 is a sectional view showing another embodiment of the present invention;

FIG. 5 is a perspective view of another embodiment of the present invention;

FIG. 6 is a sectional view taken along line 6—6 of FIG. 5.

Figure 1:
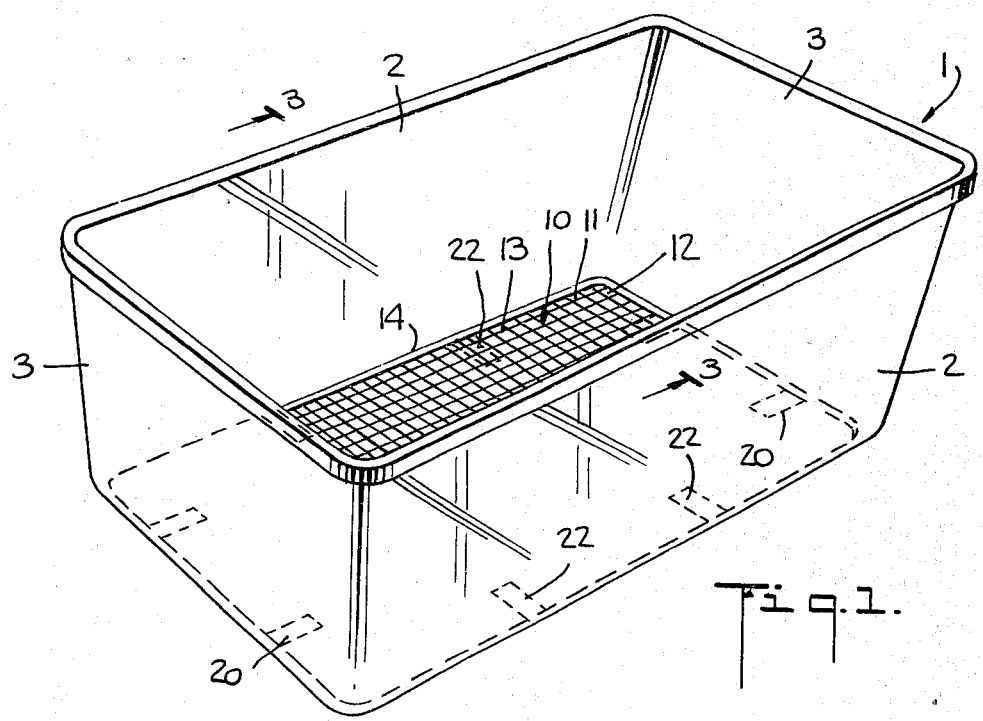
FIG. 1 is a perspective view of an animal cage showing the present invention.
Figure 2:
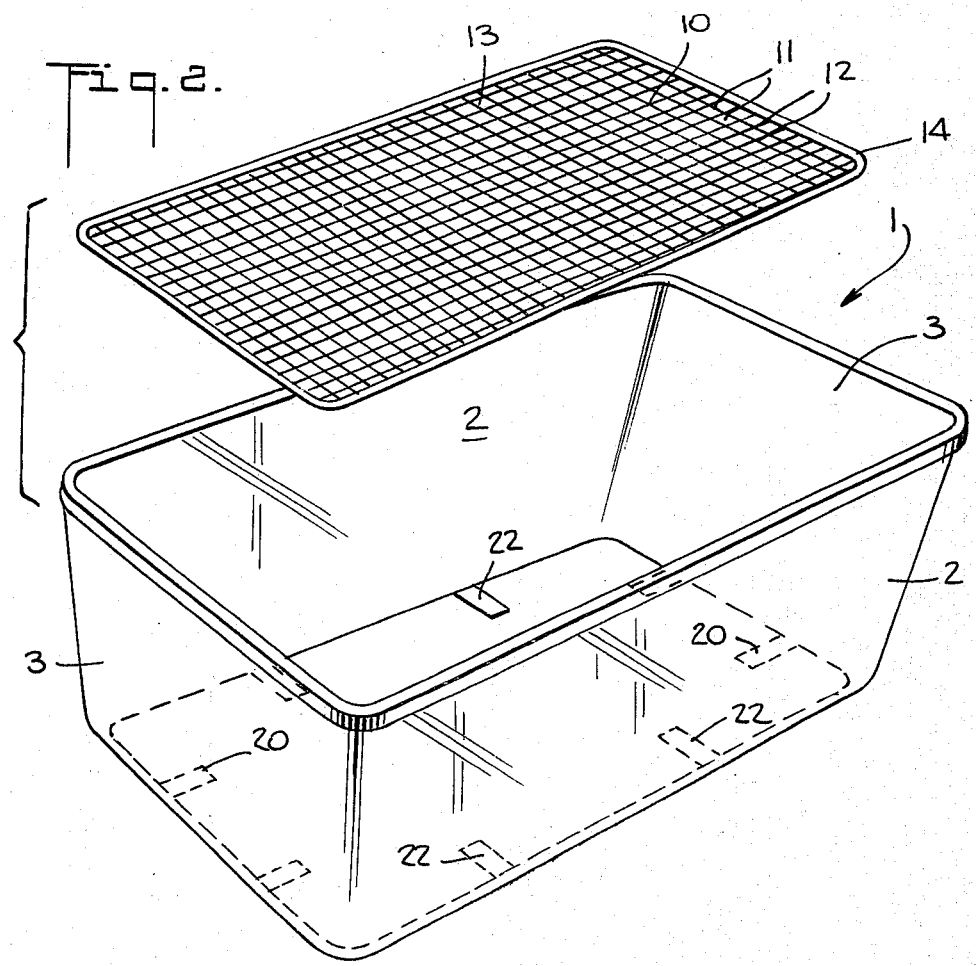
FIG. 2 is an exploded perspective view of the animal cage of the present invention.

Referring more particularly to the drawings, the cage 1 comprises integral side and end walls 2 and 3 respectively, which are preferably made of a plastic material which is preferably transparent. The side and end walls 2 and 3 are shown tapered inwardly in a downward direction, although straight walls may also be used if desired. The bottom edge of the walls 2 and 3 is tapered inwardly for a purpose to be more fully described hereinbelow.

A removable bottom 10 is made preferably from a wire mesh material and is adopted to permit a laboratory animal to walk thereon. The bottom 10 has crossed wires 11 and 12 welded or otherwise held together at their points of intersection 13 and are held together by a reinforced strengthening frame 14 with wires 11 and 12 criss-crossing each other.

The wires 11 and 12 are preferably made of small round metal gauge material and do not have any appreciable depth so that accumulation of dirt is kept at a minimum. The bulk of the dirt will fall through the mesh. The wires are welded, soldered or in any other manner mounted onto the frame 14.

Molded integrally with the lower edge of the side and end walls 2 and 3 are a plurality of bottom-supporting fingers 20 extending inwardly. The wire mesh bottom 10 rests on these fingers 20 so that it does not fall through the cage. The fingers 20 and 22 may be molded in one piece with the side and end walls 2 and 3 or they may be separate pieces. It will be seen that in the drawings, the supporting fingers have been preferably shown as being made integral with the side and end walls which is the preferred embodiment.

If desired, a lock bead 21 (FIG. 4) may be provided spaced above the fingers along at least a portion of the side and or end walls 2 and 3. This lock bead 21 may be used to prevent the bottom from being accidentally pushed upwardly during use. The lock bead 21 is adapted to lock the bottom 14 in place during use.

Referring more particularly to FIGS. 5 and 6, which shows another embodiment of the present invention, it will be noticed that the floor supporting elements comprises a plurality of ribs 25 and 26 which extend across the entire width and length of the bottom. The ribs 25 are preferably shown as being molded integral with the side and end walls but may be separate pieces which may be mounted to the cage. The ribs 25 and 26 intersect each other and are integral at the point of intersection.

If desired, a lock bead 30 shown in broken lines in FIG. 6 may be used similar to lock bead 21 in FIG. 4 to hold the bottom in place.

It will be observed that with the present invention, the cage can be washed by easily removing the bottom without the use of special tools. In addition, the cage may be washed by spraying a washing solution through the open bottom in which event it may not be necessary to even remove the bottom.

It will thus be seen that the present invention provides an improved cage in which the bottom is made of a mesh type construction which will not accumulate dirt, which is easily removed for cleaning purposes without the necessity of special tools and which the bottom is preferably made of a material that cannot be chewed by the animal.

As many and varied modifications of the subject matter of this invention will become apparent to those skilled in the art from the detailed description given hereinabove, it will be understood that the present invention is limited only as provided in the claims appended hereto.

Having thus described the invention, I claim:

1. An animal cage comprising side and end walls, a wire mesh bottom mounted within the cage, finger support means extending inwardly from at least one of said walls to support said wire mesh bottom within the cage, said fingers extending from the lower edge of the walls, said fingers extending a short distance inwardly from said walls, said fingers extending from both the side walls and the end walls, a plurality of said fingers extending from both walls, said bottom being removably mounted within the cage, and a locking bead is mounted above said fingers.

2. An animal cage comprising side and end walls, a wire mesh bottom mounted within the cage, finger support means extending inwardly from at least one of said walls to support said wire mesh bottom within the cage, said supporting finger means extending between said walls to form struts to support said bottom, said struts being integral with said walls, said struts extending from both the said walls, said struts intersecting each other and being integral with each other at the point of intersection, and said bottom is removably mounted within the cage.

3. An animal cage as claimed in claim 2 wherein a locking bead is mounted above said struts.

4. An animal cage comprising side and end walls, a wire mesh bottom mounted within the cage, support means comprising fingers integral with and extending inwardly from the lower edge of at least one of said walls to support said wire mesh bottom within the cage, said support means comprises a locking bead extending from at least one wall.

5. An animal cage as claimed in claim 4 wherein said fingers extend a short distance inwardly from the walls.

6. An animal cage as claimed in claim 5 wherein said fingers extend from both the side walls and the end walls.

7. An animal cage as claimed in claim 6 wherein a plurality of said fingers extend from both walls.

8. An animal cage as claimed in claim 7 wherein said bottom is removably mounted within the cage.

9. An animal cage as claimed in claim 4 wherein said supporting finger means extend between said walls to form struts to support said bottom.

10. An animal cage as claimed in claim 9 wherein said struts are integral with said walls.

11. An animal cage as claimed in claim 10 wherein said struts extend from both the said walls.

12. An animal cage as claimed in claim 11 wherein said struts intersect each other and are integral with each other at the point of intersection.

13. An animal cage as claimed in claim 4 wherein said locking bead extends from the lower edge of the wall.

14. An animal cage as claimed in claim 13 wherein a bead extends along opposed walls.

15. An animal cage as claimed in claim 13 wherein said bottom is removably mounted within the cage.

* * * * *